(12) United States Patent
DeMaria et al.

(10) Patent No.: US 7,829,819 B2
(45) Date of Patent: Nov. 9, 2010

(54) ATTACHING A COMPONENT TO AN INTERNAL SURFACE OF A TANK FORMED OF POLYMER

(75) Inventors: Joseph DeMaria, New Hudson, MI (US); Stanley Lank, Livonia, MI (US); James Potter, Livonia, MI (US); Mark W. Plansinis, Dearborn Heights, MI (US); Mark A. Harris, Dexter, MI (US); Michael J. Boehk, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 680 days.

(21) Appl. No.: 11/704,643

(22) Filed: Feb. 8, 2007

(65) Prior Publication Data

US 2008/0190943 A1    Aug. 14, 2008

(51) Int. Cl.
| | |
|---|---|
| *B23K 9/00* | (2006.01) |
| *B65D 25/24* | (2006.01) |
| *F16L 9/00* | (2006.01) |
| *F16K 24/00* | (2006.01) |

(52) U.S. Cl. .................. 219/122; 220/632; 220/562; 138/109; 138/110; 138/112; 138/121; 138/137; 137/587

(58) Field of Classification Search .......... 220/632, 220/562; 219/633, 618, 617; 138/112, 110, 138/151, 156, 137, 109, 121; 248/205.3, 248/74.3; 123/509; 137/587; 156/87, 163
See application file for complete search history.

(56) References Cited

U.S. PATENT DOCUMENTS

| | | | |
|---|---|---|---|
| 6,877,627 B2 * | 4/2005 | Brandner et al. | ........... 220/4.13 |
| 7,131,452 B2 * | 11/2006 | Potter et al. | .............. 137/15.17 |
| 7,204,520 B2 * | 4/2007 | Mueller et al. | ............. 285/21.1 |
| 7,378,624 B2 * | 5/2008 | Powell | ...................... 219/633 |
| 2002/0020487 A1 * | 2/2002 | Vorenkamp et al. | .... 156/244.19 |
| 2003/0089405 A1 | 5/2003 | Mills | |
| 2005/0115054 A1 | 6/2005 | Brandner et al. | |
| 2005/0115973 A1 * | 6/2005 | Brandner et al. | ........... 220/562 |
| 2006/0099365 A1 * | 5/2006 | Sasai et al. | ................. 428/35.7 |
| 2006/0283543 A1 | 12/2006 | Kubota et al. | |

FOREIGN PATENT DOCUMENTS

WO    WO0214041 A2    2/2002

* cited by examiner

*Primary Examiner*—Tu B Hoang
*Assistant Examiner*—Ket D Dang
(74) *Attorney, Agent, or Firm*—Mark L. Mollon; MacMillan, Sobanski & Todd, LLC

(57) ABSTRACT

A method for securing a component to a tank includes forming the tank having a wall of multiple layers of polymer material with an opening in the wall, outer layers of polymer, and an inner layer of polymer having an inner surface whose color is dark relative to a natural color of the outer layers. The component is formed with a mounting surface of polymer. The tube wall opening is used to install the component in the tank such that the mounting surface contacts the inner surface. Energy is transmitted onto an area of a surface of the tank wall where the mounting surface contacts the inner surface. The transmitted energy is use to produce a weld between the mounting surface and the tank wall.

7 Claims, 3 Drawing Sheets

ATTACHING A COMPONENT TO AN INTERNAL SURFACE OF A TANK FORMED OF POLYMER

BACKGROUND OF THE INVENTION

1. Field of the Invention

This invention relates generally to an assembly of components in a hollow polymer tank and, in particular, to attaching components to the surface of a wall within a tank.

2. Description of the Prior Art

Currently components such as valves are hot plate-welded to the outer surface of a polymer fuel tank. To accomplish this, a hole is bored through the tank wall, which includes a barrier layer. The breaching of the barrier layer and the construction of the current hot plate welded valves increase permeation of the tank shell.

External hot plate welding is acceptable for current emission requirements; however as emission regulations get stricter, it is necessary to place the valves inside the fuel tank to avoid boring through the fuel tank wall.

Newly developed technologies, which can be difficult and costly, focus on installing the valves during the molding process.

Internal hot plate welding of components is encumbered by limited access through the opening, such as is required for the fuel delivery module (FDM). The need to heat both the tank and component surface in hot plate welding requires multiple robotic manipulations; therefore, the process, has limited application.

Hot plate welding in the tanks imposes requirements and limitations on the design of the component to be attached to the interior of a tank that are difficult to realize. For example, in hot plate welding, a significant amount of mass is required at the weld site so that the mass is melted separately from the fuel tank surface. After the component and tank wall are heated to a molten state, they must retain heat and remain molten while the hot plate is removed from the tank, the component is inserted and joined under force, and the molten pools fuse together to create the weld.

SUMMARY OF THE INVENTION

Non-contact, through-transmission infrared (TTIR) welding uses laser or infrared sources, or some other energy source to direct energy to the weld site and create the weld. The two surfaces to be welded are placed together and the welding energy penetrates to the weld site through the component to be welded. Energy is directed into the weld joint were a non-transparent media absorbs the IR energy, melting the surface of both components and forming the bond.

A method for securing a component to a tank includes forming the tank having a wall of multiple layers of polymer material with an opening which is bored in the wall for the purpose of providing access to the interior of the tank and installing there various components, such as a fuel pump and fuel indication system. Preferably the component is formed with a mounting surface, which contacts the inner polymer layer of the tank wall. A gripping apparatus, which is connected to a robotic manipulator, is used to install the component in the tank such that the mounting surface contacts the tank's inner surface. Energy is transmitted through the component to an energy absorption surface, either a dark colored tank inner layer surface or a dark colored layer on the component weld surface, onto an area of the tank wall where the mounting surface of the component contacts the inner surface. The transmitted energy is used to provide heat, which melts the polymer to produce a weld between the component mounting surface and the tank wall.

The extending wing mounting surfaces of the component allow for a compact component design, which maximizes the vent closure height of the valve, while establishing a weld in a position such that the TTIR heat source can be located directly under it.

The method enables proper shielding of the welding energy source to protect the barrier layer inside the tank wall as well as to protect the component, valve, line clip, reservoir, etc. that is being welded to the tank wall.

The process creates a weld that is strong, yet, in the event of a dynamic impact, there is no rupture failure of the tank surface. Destructive weld testing indicates that the likely failure mode due to a pull-off is either the wing of the component failing at the junction of the weld, or a parent material pull-off the weld itself.

The component being welded can be manufactured from HDPE to insure the ability to weld it to the tank wall. Using a natural (uncolored) HDPE for the component will allow the IR radiant energy to pass through to a black inner fuel tank wall were the energy will be absorbed, which will then heat both wall and component at the weld. The wing mounting surfaces of the component also enable the addition of a film of black HDPE material either attached post mold or inserted into the injection mold to provide the IR absorbing layer for welding the component to a natural HDPE inner fuel tank surface.

The welding feature can be adapted to a vapor control valve or other component with either a separate piece which is attached to the vapor valve or as an integrally designed portion of the valve. Placing the welding features 180 degrees apart and making them symmetrical allows for a weld head to have compliance or flexibility to assist with the weld on an angled surface. The welding features can be non-symmetrical and located at an angle other than 180 degrees apart, but the size and complexity of the welding device is hampered by doing so. The method optimizes the ability to grip the component and later release the component from a weld gripper apparatus, while maintaining a narrow profile necessary for the restricted access inside the tank.

The method permits the weld features to be placed on a inner tank surface, pass-through IR energy, and allow the application of force to the weld feature during the welding process in order to insure good molecular entanglement and production of a good weld. The feature also allows the valve manufacturer optimal opportunity to locate a nipple extension from the valve, to which an internal vent line is attached. The weld area is slightly elevated from the rest of the component to insure that unmelted portions of the component do not contact the inner tank surface during the welding operation, thereby holding the weld pad away from the inner tank surface as melting occurs.

Placing the features 180 degrees apart enables the use of a welder compliant in the plane created by the two weld areas to assist with welding to an inner tank surface that may not be perfectly parallel. Locating the features to the side enables the potential use of vision type inspection systems to confirm valve placement. The elevation of the weld pads keeps unmelted portions of the component from contacting the inner tank surface and holding the component off of the inner surface of the tank wall.

The size and design of the weld area provides sufficient surface area for a durable welded attachment of an internal vapor valve; however, in the case of an excessive impact, the fuel tank wall should not be breached).

In the event of an excessive impact, the design of the wing feature can enable the component to tear adjacent to the weld and not damage the base valve.

The design of the weld pad optimizes the ability to add a black film to the pad either during the molding operation or post molding to provide the energy absorbing material for the weld in the case of a natural HDPE inner tank wall surface.

The weld pad profile is conducive to an optimum weld via IR lamp or laser welding technologies by providing a well-defined weld surface, around which shielding can be installed to prevent melting of critical area outside the weld area.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
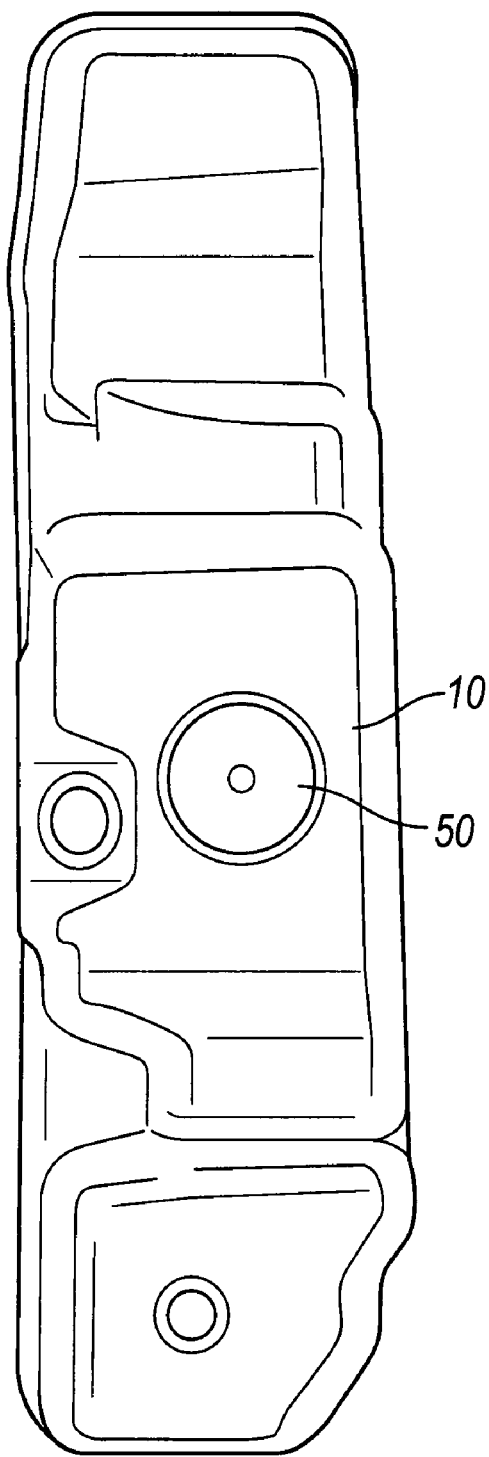
FIG. 1 is an isometric view of a hollow tank formed in a mold and to which a component can be attached to an internal wall of the tank by the method.

FIG. 1 illustrates a hollow body 10, which is preferably in the form of a hollow tank having a wall 12 (shown also in FIG. 2) formed of multiple layers of plastic. The tank 10 is usually and preferably formed by extruding layers of polymer through the orifice of an extrusion die. The extrusion is then closed, sealed and formed to shape in a mold, usually by applying blow-molding techniques. Twin sheet thermoforming is another technique used to manufacture these type tanks. A cross section taken at a plane perpendicular to the longitudinal axis of the tank may have any suitable shape.

Figure 2:
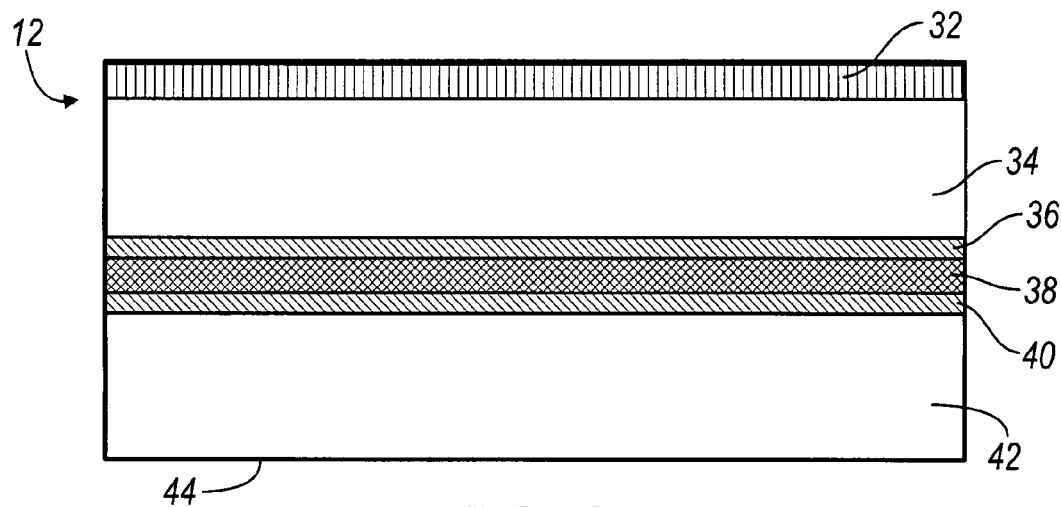
FIG. 2 is an end view showing the layers of polymer material comprising a wall of the tank of FIG. 1.

FIG. 2 shows that the wall thickness 12 of the tank 10 includes a composite of various polymer layers including a relatively thin outer layer 32 of high density polyethylene (HDPE); a thick layer of scrap material 34, called regrind, sometimes incorporated into the multilayer wall thickness; a thin layer of adhesive 36, called a binder; a thin layer of barrier material 38, such as ethylene-vinyl alcohol (EVOH) copolymer; a second layer of adhesive 40; and a relatively thick, inner layer 42 of HDPE. The binder layers 36, 40 located between the HDPE and EVOH materials promote adhesion of the adjacent layers.

When the tank 10 is fully formed after processing in the mold, it may be used as a fuel tank in a motor vehicle. The wall 12 is formed as a composite of multiple layers to prevent hydrocarbons emitted by fuel carried in the tank from passing through the thickness of the wall 12 and to provide flexural stiffness and strength. The HDPE layer 42 provides the inner surface 44 of the tank 10 and is in contact with gasoline or another fluid contained in the tank. The wall of the tank 10 contains at least one barrier layer 38 located within the multilayer polymeric structure and surrounded on both sides by at least one layer of plastic having relatively insignificant barrier properties. The term "barrier layer" means a layer that has low permeation to gases and liquids. It generally contains a barrier resin. Any known barrier resin may be present in the hollow body, provided that it is effective with respect to the fluids likely to be in contact with the container, particularly hydrocarbons. Non-limiting examples of possible resins for the barrier layer 38 include polyamides or copolyamides and random copolymers of ethylene and of vinyl alcohol. A blend of different barrier resins is also possible.

The term "plastic" means any material containing at least one polymer. Thermoplastic polymers are preferred. The term "polymer" means both homopolymers and copolymers. Examples of such copolymers include, without limitation, random copolymers, copolymers from sequenced polymerization, block copolymers and graft copolymers. Thermoplastic polymers also include thermoplastic elastomers and blends thereof. In particular, the tank 10 may contain polyolefins, thermoplastic polyesters, polyketones, polyamides and copolymers thereof.

A polymer often present in the wall of tank 10 is polyethylene. The attachment method has produced excellent results with high density polyethylene (HDPE). A copolymer often used is the ethylene-vinyl alcohol (EVOH) copolymer. A blend of polymers or copolymers may also be used, as may a blend of polymeric substances with inorganic, organic and/or natural fillers.

Figure 3:
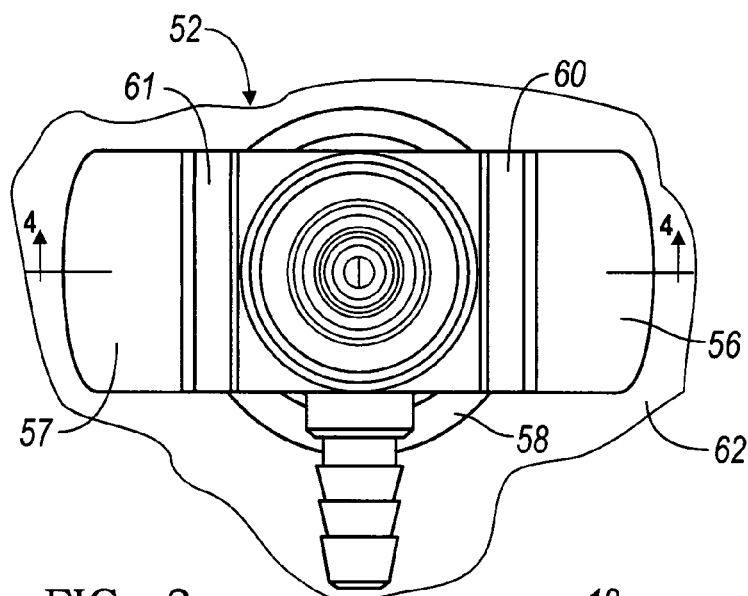
FIG. 3 is a top view of a component to be welded to the tank wall.

After the wall 12 of tank 10 is formed, an opening 50 is bored through the tank wall 12. In the case where the tank is a fuel tank, the opening 50 is for the later installation of a fuel delivery module (FDM) having a diameter of about 130 mm, although other diameters can be used. As shown in FIG. 3, a component 52, which can be handled by the associated welding apparatus, is inserted through the opening 50, moved to its proper position within the tank 10, and welded there to the inner surface 44 of the tank using a TTIR process.

Figure 4:
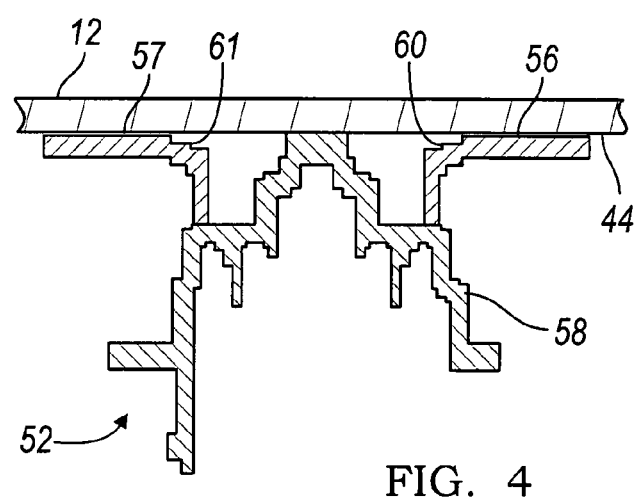
FIG. 4 is a cross section of the component taken at plane 4-4 of FIG. 3.

FIGS. 3 and 4 illustrate a valve component 52 formed with lateral weld features, such as wings or flanges 56, 57, manufactured from HDPE to provide the ability to weld the wings to the inner surface 44 of the tank wall 12. The wings are spaced from the body 58 by recesses 60, 61 so that heat energy transmitted to the component 52 is concentrated at the wings 56, 57, but not on the body of the component. The contour of the wings 56, 57 conforms closely to the contour of a target area 62 of the inner surface 44 of the tank wall 12 where component 52 will be welded to the tank 10.

Figure 5:
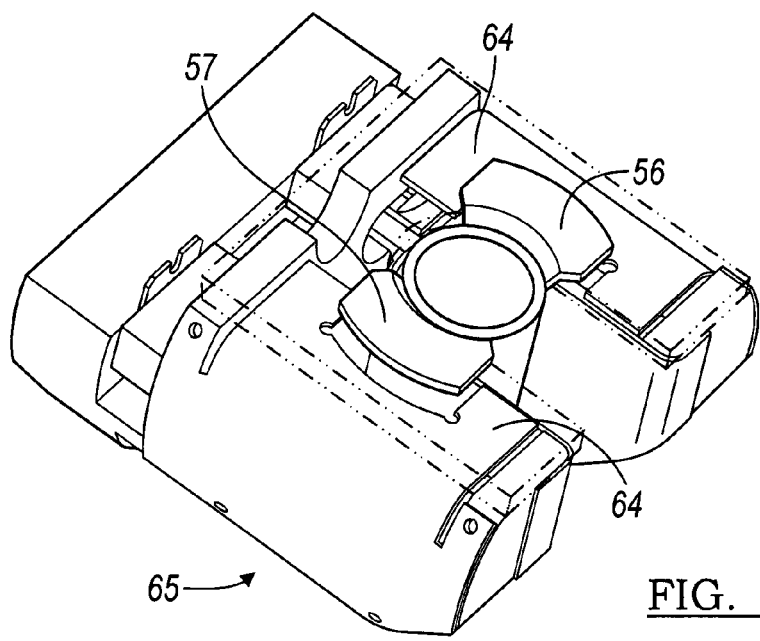
FIG. 5 is an isometric view of the component held by a gripper and in position to be welded to the tank wall.
Figure 6:
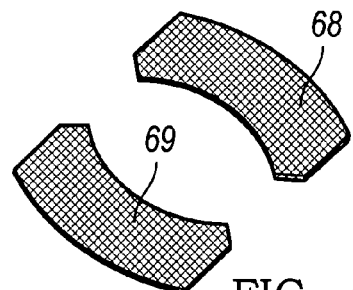
FIG. 6 is an isometric top view of polymer film that may be secured to the wings before welding the component to the tank wall.

Refer now to FIGS. 5 and 6. FIG. 5 illustrates an energy source 64 of IR radiation or laser light, located integral to component grippers 65, which engage the component 52 outside the tank 10, carry the component through the access hole 50, and hold the component with the wings 56, 57 contacting the inner surface 44 of the wall 12 at area 62 while a weld is produced. Energy from source 64 is directed through wings 56 and 57 to an energy absorber, which is either the black or dark-colored inner surface 44 of tank wall 12 (seen best in FIG. 2), or black or dark-colored areas of thin film 68, 69 attached to the outer surfaces of wings 56, 57, respectively. Energy from source 64 heats the top surface of wings 56, 57 and the inner surface 44 of tank wall 12 at area 62, thereby creating a weld or bond between component 52 and tank wall 12 inside the tank.

Figure 7:
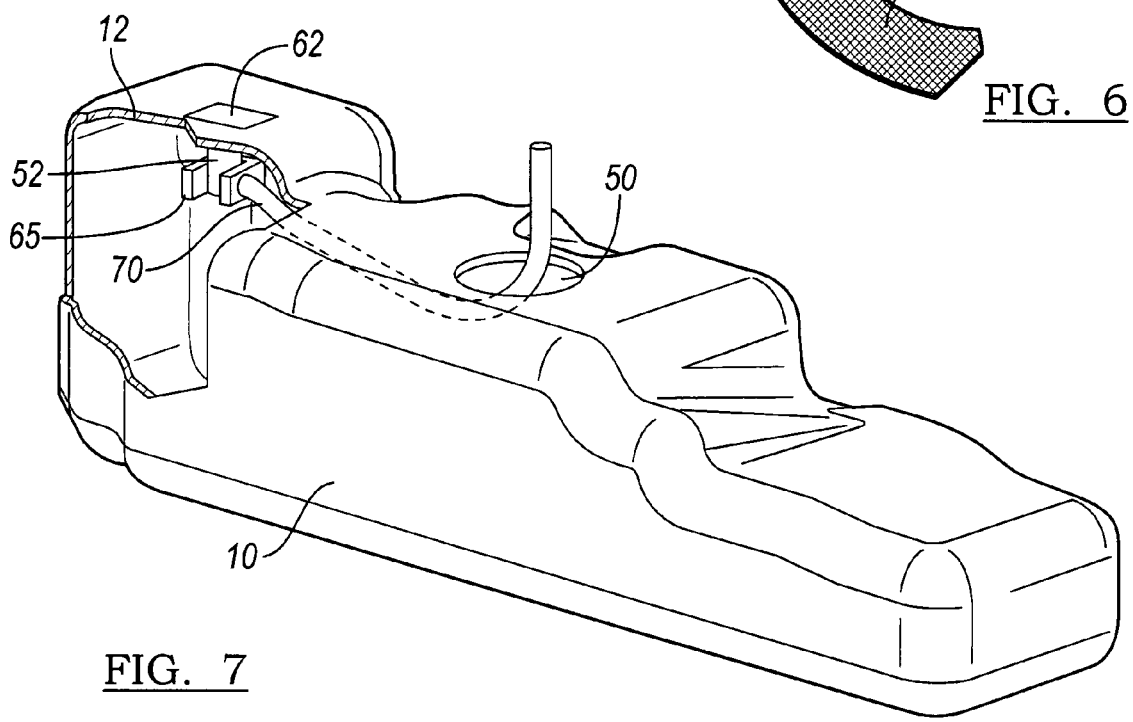
FIG. 7 is an isometric view of a formed hollow body showing a gripper holding the component in position to be welded to the wall.

FIG. 7 illustrates the component 52 engaged by the gripper 65, which is supported on a robotically manipulated flexible arm 70 that entered the hollow body 10 through hole 50. The arm moves the gripper 65 into its welding position where the wings 56, 57 contact the inner surface 44 of the wall 12 at the target area 62. When the gripper and component are located as shown, energy from source 64 heats the top surface of wings 56, 57 and the inner surface 44 of tank wall 12 at area 62, thereby creating a weld or bond between component 52 and tank wall 12 inside the hollow body.

The wings 56, 57 are preferably formed of natural, i.e., uncolored, HDPE, which material allows IR or laser radiant energy to pass through the wings 56, 57 to the black inner surface 44 of the wall 12 of HDPE. Preferably the HDPE layer 42 of wall 12 is black or dark-colored. In this way, the area 62 of the black HDPE inner surface 44 of wall layer 42 immediately in contact with the wings 56, 57 onto which area radiant energy is directed and absorbed, and the surfaces of the wings 56, 57 contacting the inner surface 44 at area 62 are heated. Energy radiated from the energy source 64, which is located within the tank 10, continues to be directed onto the target area 62 until the temperatures of the mutually contacting surfaces of the wings 56, 57 and the inner surface 44 of the tank 10 increase sufficiently to weld the component 52 to the tank wall 12.

Alternatively, the color of the inner HDPE layer 42 of the tank wall 12 may be its natural color, i.e., uncolored by adding carbon, black colorant, or another dark colorant to the HDPE polymer. In this instance, thin films 68, 69 of black HDPE material are applied to the inner surface of the wings 56, 57 of component 52 either during the molding process for the component or after the component is molded. In either case, films 68, 69 are secured to the wings 56, 57 and contact the inner surface 44 at target area 62. When energy transmitted by the source 64 is absorbed at the films 68 and 69, the temperatures of contacting surfaces of the wings 56, 57 and inner surface 44 of the tank 10 increase sufficiently to produce a weld between component 52 and the inner surface 44 of the tank 10.

The design of the welding feature can be adapted to the vapor control valve with either a separate piece which is attached to the vapor valve or as an integrally designed component of the valve. Placing the welding features 180 degrees apart and making them symmetrical allows the weld head to have design compliance flexibility to assist with the weld on an angled surface. The design optimizes the ability to grip the component and later release the component from the weld gripper apparatus while maintaining a narrow profile necessary for the restricted access inside the tank. The design permits the weld features to be placed on a surface which is able to pass through IR light to allow the application of force to the weld feature during the welding process in order to insure good molecular entanglement and hence a good weld. The feature also allows the valve manufacturer optimal opportunity to locate the nipple extension from the valve to which the internal vent line is attached. The weld area is slightly elevated from the rest of the component to insure un-melted material does not contact the inner tank surface during the welding operation, holding the component being welded away from the tank surface as melting occurs.

Although the method is described with reference to a fuel tank 10 for a motor vehicle, the method is applicable also to any hollow body. The term "hollow body" means any structure, which includes a wall surrounding at least one empty or hollow, concave part. Preferably, a hollow body denotes a closed structure such as a reservoir or tank suitable for containing liquids, gases, or mixtures of liquids/gases. A hollow body may have openings through its wall, which allowing communication with the external environment, and it may contain a fluid pump, level sensing equipment valves, and other components.

In accordance with the provisions of the patent statutes, the preferred embodiment has been described. However, it should be noted that the alternate embodiments can be practiced otherwise than as specifically illustrated and described.

What is claimed is:

1. A fuel tank system for a motor vehicle, comprising:
    a fuel tank formed with a polymeric wall having an inside surface and having an opening in the wall; and
    a valve component that is welded to the inside surface of the polymeric wall, wherein the valve component is comprised of:
        a body portion for engaging a gripper on a robotic arm that places the valve component through the opening in the wall and into a welding position;
        a first wing secured to and extending laterally from the body, formed of polymer, and including a first surface that at least partially contacts the inside surface at the welding position; and
        a second wing secured to and extending laterally from the body and spaced from the first wing, formed of polymer, and including a second surface that at least partially contacts the inside surface at the welding position;
    wherein at least the first and second wings or the polymeric wall of the fuel tank include a thin film of black polymer for heating by radiant energy that is emitted inside the fuel tank from an energy source carried on the robotic arm until a weld forms between the first and second wings and the polymeric wall, wherein the thin film of black polymer comprises a first thin film of black polymer secured to the first surface and a second thin film of black polymer secured to the second surface.

2. The fuel tank system of claim 1 wherein:
    the first surface has a first contour that at least partially conforms to a contour of the inside surface at the welding position; and
    the second surface has a second contour that at least partially conforms to a contour of the inside surface at the welding position.

3. The fuel tank system of claim 1 wherein:
    the first wing and the second wing are formed of high density polyethylene.

4. A method for welding a valve component to a fuel tank of a motor vehicle, the method comprising the steps of:
    (a) forming the tank having a wall of multiple layers of polymer material with an opening in the wall, outer layers of polymer, and an inner layer of polymer having an inner surface whose color is dark relative to a natural color of the outer layers;
    (b) forming the valve component of polymer that includes a first wing having a first surface that at least partially contacts the inner surface at the location of the weld, and a second wing spaced from the first wing having a second surface that at least partially contacts the inner surface at the location of the weld;
    (c) applying a first thin film of black polymer to the first surface and a second thin film of black polymer to the second surface;

(d) gripping the valve component with a robotic arm and inserting it through the opening in the tank such that the first and second surfaces contact the corresponding inner surface of the tank at the location of the weld; and (e) transmitting the radiant energy from the robotic arm through the first and second wings to the first and second thin films of black polymer to heat the first and second wings and the inner layer until a weld forms.

5. The method of claim 4 wherein the inner surface of the inner layer is black.

6. The method of claim 4 wherein the radiant energy in step (de) comprises IR radiation.

7. The method of claim 4 wherein the radiant energy in step (de) comprises laser light.

* * * * *